United States Patent [19]

Manders

[11] 4,088,923
[45] May 9, 1978

[54] FLUORESCENT LAMP WITH SUPERIMPOSED LUMINESCENT LAYERS

[75] Inventor: Lambertus Wilhelmus Johannes Manders, Eindhoven, Netherlands

[73] Assignee: U.S. Philips Corporation, New York, N.Y.

[21] Appl. No.: 710,466

[22] Filed: Aug. 2, 1976

Related U.S. Application Data

[63] Continuation of Ser. No. 557,275, Mar. 11, 1975, abandoned.

[30] Foreign Application Priority Data

Mar. 15, 1974 Netherlands .......................... 7403467

[51] Int. Cl.² .............................................. H01J 61/48
[52] U.S. Cl. .................................................... 313/487
[58] Field of Search ......................................... 313/487

[56] References Cited

U.S. PATENT DOCUMENTS

| 3,602,758 | 8/1971 | Thornton et al. | 313/487 |
| 3,937,998 | 2/1976 | Verstegen et al. | 313/487 |

*Primary Examiner*—Palmer C. Demeo
*Attorney, Agent, or Firm*—Frank R. Trifari; Norman N. Spain

[57] ABSTRACT

Electric discharge lamp in which ultraviolet radiation is converted into light by means of two superposed luminescent layers. The two layers have about the same chromaticity point. The luminescent material in the layer more remote from the discharge is cheaper than that in the other layer.

3 Claims, 1 Drawing Figure

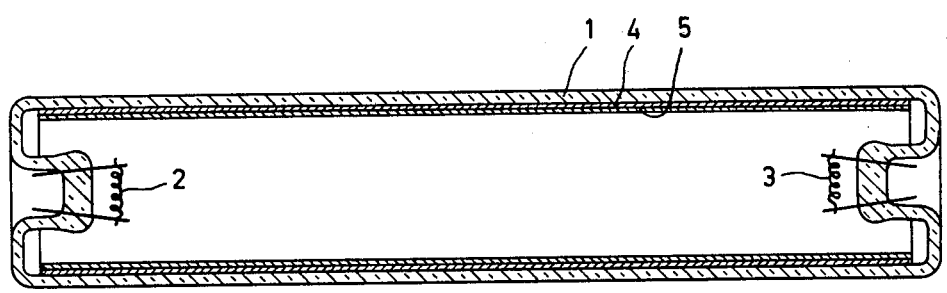

is a continuation, of application Ser. No. 557,275, filed Mar. 11, 1975 and now abandoned.

FLUORESCENT LAMP WITH SUPERIMPOSED LUMINESCENT LAYERS

This is a continuation, of application Ser. No. 557,275, filed Mar. 11, 1975 and now abandoned.

The invention relates to an electric gas discharge lamp in which radiant energy emitted by the gas discharge is converted by means of luminescent material disposed on a light-transmissive support into radiation in the visible part of the spectrum. The invention relates in particular to gas discharge lamps in which the discharge is produced in a mercury vapour atmosphere, which lamps may be low-pressure or high-pressure mercury vapour lamps. In the former type of lamps the luminescent material generally is disposed on the interior surface of the wall of the discharge space proper; in the second type of lamps the luminescent material usually is disposed on a bulb which encloses the discharge tube proper.

In order to obtain a given desired colour rendition of such lamps with a high light output it has already been proposed to blend different luminescent materials with one another or to apply them to the support in superposed layers.

According to U.S. Pat. No. 3,602,758 the procedure starts from a desired chromaticity which can be achieved with a given light output and a given colour rendition by means of a single layer which comprises a blend of luminescent materials. As far as this purpose can be accomplished by means of a blend of more expensive and less expensive luminescent materials, according to the said patent specification a saving is obtainable by using superposed layers, the material of the layer which is directly disposed on the support being cheaper than the material in the layer or layers nearer the discharge, for it has been found that thus a lesser amount of the more expensive material is required than when all the materials are blended in a single layer. The distinct layers together produce light having the desired chromaticity, but the chromaticity points of the light from the separate layers naturally are different. This is a great disadvantage, because it was found in practice that in the manufacture of the lamps the thickness of the layers, in particular the thickness of the layer facing the discharge, must be kept within very narrow limits, because, as the chromaticity of the radiations from the different layers are different, even a small variation in the thickness of this layer, which for considerations of cost must be made as thin as possible but still is to convert the larger part of the radiation of the discharge into light, produces a considerable change of the chromaticity and of the colour rendition of the lamp. In mass production such requirements obviously are unacceptable, because they lead to expensive manufacture, inter alia since all stages of manufacture of the lamps have to be thoroughly checked.

An electric gas discharge lamp according to the invention has a luminescent screen which comprises a light-transmissive support on which are disposed two superposed luminescent layers which each on excitation by the radiation emanating from the discharge emit light, the layer nearer the discharge consisting of a luminescent material which per unit weight is more expensive than the material of the other luminescent layer, and is characterized in that difference between the chromaticity of the light emitted by either of the layers is less than $(3.5/1-p)$ CIE units, where $p$ represents that part of the overall amount of radiation emanating from the discharge and converted into light which is converted by the luminescent layer which faces the discharge, and $p$ lies between the values 0.80 and 0.99.

The aforementioned CIE units were published in Paris in 1964 in a report of the CIE Congress held in Vienna in 1963.

The aforementioned case that all the luminescent materials required for satisfactory colour rendition and high light output are expensive occurs, for example in lamps in which the layer facing the discharge comprises a blend of three luminescent materials activated by rare earth metals and having line emissions between 430 and 490 nanometers, between 520 and 565 nanometers and between 590 and 630 nanometers, respectively.

When using the characterizing principle of the invention the amounts of all these expensive luminescent materials can be greatly reduced without losses in light and whilst retaining the satisfactory colour rendition, as will be shown hereinafter with reference to Examples. A condition is, however, as was stated hereinbefore, that a least 80% and at most 99% of the total amount of radiation converted into light is converted by the layer which faces the discharge. If this layer contributes less than 80%, a small deviation from this value has a comparatively great influence on the colour rendition of the light emitted by the lamp; if the layer contributes more than 99%, the amount of saving is too small. Preferably the contribution is selected to exceed 90%.

This invention will now be described more fully with reference to Examples and to a drawing which schematically shows a low-pressure mercury vapour lamp according to the invention.

Referring now to the FIGURE, reference numeral 1 denotes the wall of the discharge lamp. The discharge space accommodates electrodes 2 and 3. The discharge is produced by means of these electrodes in the discharge space which is filled with mercury vapour and one or more noble gases, as is usual for lamps of such type. The inner surface of the lamp wall 1 is coated with two superposed luminescent layers 4 and 5.

As is known, with suitably selected voltages a discharge is produced in the discharge space of the above-described lamp, which discharge emits largely ultraviolet radiation, in particular at a wavelength of 254 nm. This radiation excites the luminescent materials in the layers 4 and 5. Depending upon the natures of these materials the layers each emit radiation having a specific spectral energy distribution and a given chromaticity, the radiation emitted by the lamp being the sum of the radiations of each of the layers 4 and 5.

According to the principle of the invention the layer 4 comprises a luminescent material or a blend of luminescent materials which per unit weight is less expensive than the material or the blend of materials in the layer 5. The chromaticity points of the radiation of the two layers are different; however, as mentioned hereinbefore, the difference does not exceed $(3.5/1-p)$ CIE units. In the layer 5 at least 80% and at most 99% of the ultraviolet radiation is converted into light. The part of the ultraviolet radiation which is not converted in this layer is converted in the layer 4 substantially entirely into light having a chromaticity point equal to or slightly different from the chromaticity of the light emitted by the layer 5. Superposition of the layers 4 and 5 permits of making the layer 5 thinner than if the layer 4 were absent while retaining substantially the same light output. This will be seen from Table I which shows figures measured on a 40 watt fluorescent lamp.

TABLE I

| color temp. of the lamp | number of the lamp | | composition and weight of the luminescent layers | relative light output after 100 hours | chromaticity coordinates of the lamp | | colour rendering index Ra |
|---|---|---|---|---|---|---|---|
| | | | | | x | y | |
| 4,000° K | 1 | single layer | 5.0 g (15%A + 35%B + 50%C) | 100 | 382 | 375 | 83.2 |
| 4,000° K | 2 | layer 5 | 3.1 g (15%A + 35%B + 50%C) | 100.5 | 381 | 375 | 83.6 |
| | | layer 4 | 3.0 g calcium-white | | | | |
| 4,000° K | 3 | layer 5 | 2.3 g (15%A + 35%B + 50%C) | 100.6 | 379 | 376 | 83.6 |
| | | layer 4 | 3 g calciumhalo-phosphate-white | | | | |
| 4,000° K | 4 | layer 5 | 1.6 g (15%A + 35%B + 50%C) | 98.5 | 379 | 379 | 82.0 |
| | | layer 4 | 3.0 g calciumhalo-phosphate-white | | | | |
| 3,000° K | 5 | single layer | 5.3 g (6%A + 25%B + 69%C) | 100 | 438 | 401 | 85.0 |
| 3,000° K | 6 | layer 5 | 2.3 g (6%A + 25%B + 69%C) | 99.1 | 443 | 401 | 85.0 |
| | | layer 4 | 3.0 g calciumhalo-phosphate-warm-white | | | | |
| 3,000° K | 7 | layer 5 | 1.1 g (6%A + 25%B + 69%C) | 98.5 | 444 | 402 | 72.0 |
| | | layer 4 | 3.0 g calciumhalo-phosphate-warm-white | | | | |

In Table I:
A is a luminescent material of the formula $Ba_{0.9}Eu_{0.1}^{++} Mg_2 Al_{16}O_{27}$,
B is a luminescent material of the formula $Ce_{0.67}^{+++} Tb_{0.33} Mg Al_{11}O_{19}$
C is a luminescent material of the formula $Y_{1.95}Eu_{0.05}^{+++}O_3$.

In the Table numbers 1 and 5 denote reference lamps not constructed according to the invention.

A comparison of the lamps 2, 3 and 4 with the reference lamp 1 shows that after 100 operating hours there is substantially no difference in light output, chromaticity coordinates and colour rendition. However, the lamps 2, 3 and 4 contain a considerably smaller amount of the expensive materials A, B and C.

A comparison of the lamps 6 and 7 with the reference lamp 5 gives a similar picture. Only the Ra value decreased considerably in the lamp 7. However, only 1.1 g of the blend of the materials A, B and C is used, with a resulting large saving in cost. Accordingly the value of the conversion factor p is low in this very thin layer, namely 0.80. In the lamp 4 the value of p is about 0.87.

An impression of the variation of the light output as a function of the layer thickness in a lamp which contains only one layer of a blend of 6% of A, 25% of B and 69% of C is given by the following Table.

TABLE II

| Layer weight | relative light output |
|---|---|
| 5.3 | 100 |
| 4.1 | 99.4 |
| 3.2 | 97.4 |
| 2.6 | 95.5 |
| 2.1 | 92.0 |

A comparison between the values of Table II and those of Table I shows clearly that the losses in light which would be produced by reducing the thickness of the layer in a single-layer lamp, which naturally would also give a cheaper lamp, do not occur, or occur in a considerably lesser degree, in the lamps according to the invention.

Applying the various layers in the lamps according to the invention may take place in an entirely conventional manner, for example by mixing the luminescent materials concerned with a binder, such as ethylcellulose or nitrocellulose, in a solution of butyl acetate or another solvent, coating the tube wall with such a suspension, drying and heating to remove the binder.

Although in the above a low pressure mercury vapour discharge lamp was given as an example, the principle of the invention is applicable, without essential modifications, to other lamps, for example to high pressure mercury vapour discharge lamps.

What is claimed is:

1. Electric gas discharge lamp having a vacuum tight radiation transmitting envelope comprising a quantity of mercury and a quantity of rare gas and provided with electrodes between which the discharge takes place during operation and a luminescent screen which comprises a light-transmissive support on which two superposed luminescent layers are disposed each of which layers on excitation by the radiation emanating from the discharge emit light, the layer which faces the discharge consisting of a luminescent material which per unit weight is more expensive than the material of the other luminescent layer, characterized in that the fraction p of the total amount of radiation emanating from the discharge which is converted into light by the luminescent layer facing the discharge lies between the values 0.80 and 0.99 and that the chromaticity of the light emitted by both luminescent layers together deviates less than 3.5 CIE units from the chromaticity of the light emitted by the luminescent layer facing the discharge.

2. Electric gas discharge lamp as claimed in claim 1, characterized in that the luminescent layer more remote from the discharge comprises one or more halophosphates of calcium and/or strontium activated by antimony and/or manganese and the layer facing the discharge consists of a blend of three luminescent materials which are activated by rare earth metals and have line emissions between 430 and 490 nanometers, between 520 and 565 nanometers and between 590 and 630 nanometers respectively.

3. Electric gas discharge lamp as claimed in claim 2, characterized in that the layer which faces the discharge consists of a blend of yttrium oxide activated by trivalent europium, cerium magnesium aluminate activated by trivalent terbium and barium magnesium aluminate activated by divalent europium.

* * * * *